(12) United States Patent
Codilian et al.

(10) Patent No.: US 6,882,496 B1
(45) Date of Patent: Apr. 19, 2005

(54) METHOD FOR ADAPTIVELY ALLOCATING DATA STORAGE TRACKS IN A DISK DRIVE TO IMPROVE SEEK PERFORMANCE

(75) Inventors: Raffi Codilian, Irvine, CA (US); Dalwinder Singh, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 138 days.

(21) Appl. No.: 10/448,482

(22) Filed: May 30, 2003

(51) Int. Cl.[7] .............................................. G11B 21/02
(52) U.S. Cl. ........................... 360/75; 360/25; 360/31; 711/112; 711/170
(58) Field of Search ............................. 360/25, 48, 31, 360/53, 75, 78.01, 78.04, 78.08–78.09; 714/703–704, 710, 723, 769–770; 711/4, 101, 111–112, 170–171, 221

(56) References Cited

U.S. PATENT DOCUMENTS 6,301,679 B1 * 10/2001 Tan ............................ 714/723
2004/0075933 A1 * 4/2004 Hetzler et al. ................ 360/75

* cited by examiner

Primary Examiner—Sinh Tran
Assistant Examiner—Jason Olson
(74) Attorney, Agent, or Firm—Won Tae C. Kim, Esq.; Robroy R. Fawcett, Esq.

(57) ABSTRACT

A band of data storage tracks adjacent to an initial OD (outer diameter) limit are analyzed to determine a track defect density based on flagged tracks within the band. If the defect density exceeds a predetermined threshold, them the disk drive is reconfigured by adjusting initial OD and ID (inner diameter) limits to exclude the analyzed band and to maintain a targeted storage capacity. Adjusting the initial OD and ID limits improves the disk drive's seek performance which would otherwise be disproportionately impacted by the defect density in the analyzed band.

7 Claims, 3 Drawing Sheets

METHOD FOR ADAPTIVELY ALLOCATING DATA STORAGE TRACKS IN A DISK DRIVE TO IMPROVE SEEK PERFORMANCE

BACKGROUND OF THE INVENTION

1. Field of the Invention

The present invention relates to configuring high-performance magnetic disk drives, and more particularly, to adaptively allocating data storage tracks to improve and optimize seek performance.

2. Description of the Prior Art and Related Information

In a high performance magnetic disk drive, seek performance is an important feature. Improving the seek performance improves the disk drive's response time to data read and write requests.

Accordingly, there exists a need for improving the seek performance of a disk drive. The present invention satisfies this need.

SUMMARY OF THE INVENTION

The present invention may be embodied in a method for improving the seek performance of a disk drive. The disk drive has a disk formatted with a plurality of concentric data storage tracks, and has an actuator for positioning a head over the data storage tracks between an outer diameter (OD) limit and an inner diameter (ID) limit for reading and writing data. The disk drive is configured to meet a targeted data storage capacity by allocating data storage tracks between the OD and ID limits. In the method, the data storage tracks between an initial OD limit and an initial ID limit are scanned to flag data storage tracks which are not suitable for storing data. A band of data storage tracks nearest to and including the initial OD limit are analyzed to determine a track defect density based on flagged data storage tracks within the band of data storage tracks. If the track defect density of the band of data storage tracks exceeds a predetermined threshold, then the disk drive is reconfigured by adjusting the initial OD and ID limits to exclude the analyzed band of data storage tracks and to maintain the targeted data storage capacity. Adjusting the initial OD and ID limits improves the seek performance which would otherwise be disproportionately impacted by the track defect density in the analyzed band of data storage tracks.

In more detailed features of the invention, adjusting the initial OD and ID limits may comprise replacing the excluded analyzed band of data storage tracks with a replacement band of data storage tracks that extends from the initial ID limit toward an ID of the disk. Similarly, adjusted OD and ID limits may be set. Also, the data storage capacity of the excluded band may be about three percent of the targeted data storage capacity.

In other more detailed features of the invention, the predetermined threshold for the track defect density may be a ratio of about one flagged data storage track per every one hundred data storage tracks. The flagged data storage tracks within the excluded band may comprise a minority, or a majority, of the data storage tracks within the excluded band.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
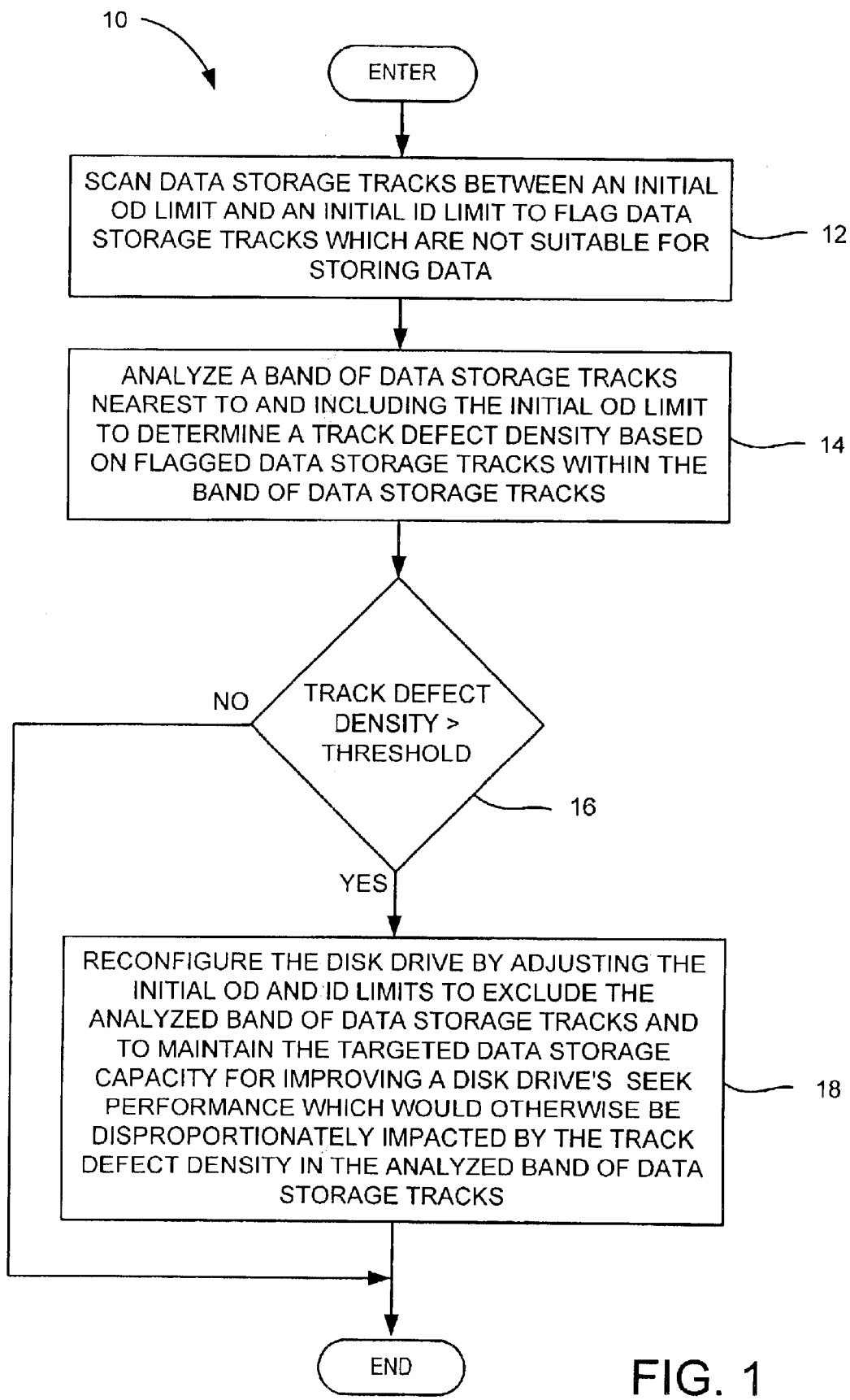
FIG. 1 is a block diagram of a method for adaptively allocating data storage tracks in a disk drive to improve seek performance, according the present invention.
Figure 2:
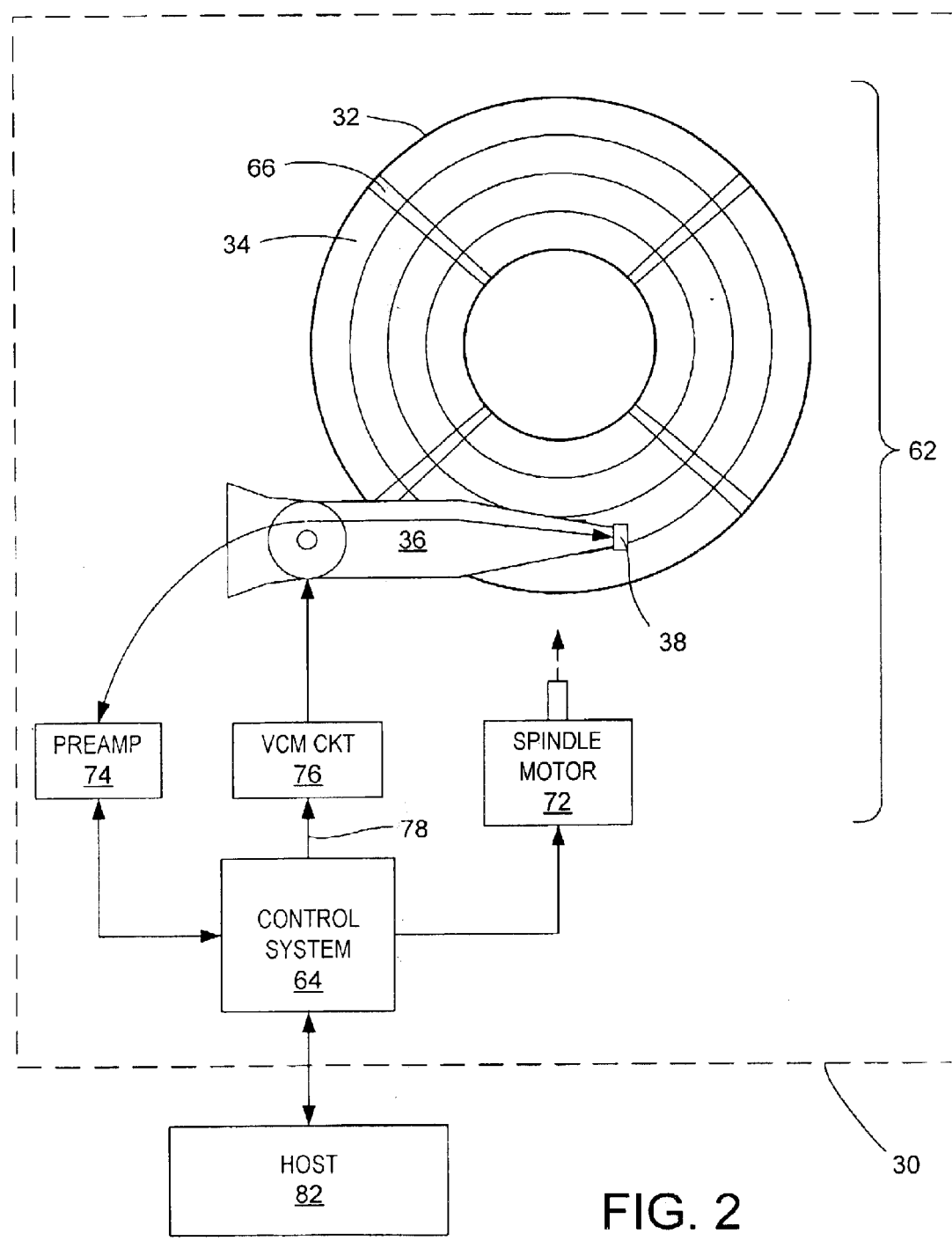
FIG. 2 is a block diagram of a disk drive for implementing the allocating method of FIG. 1.
Figure 3:
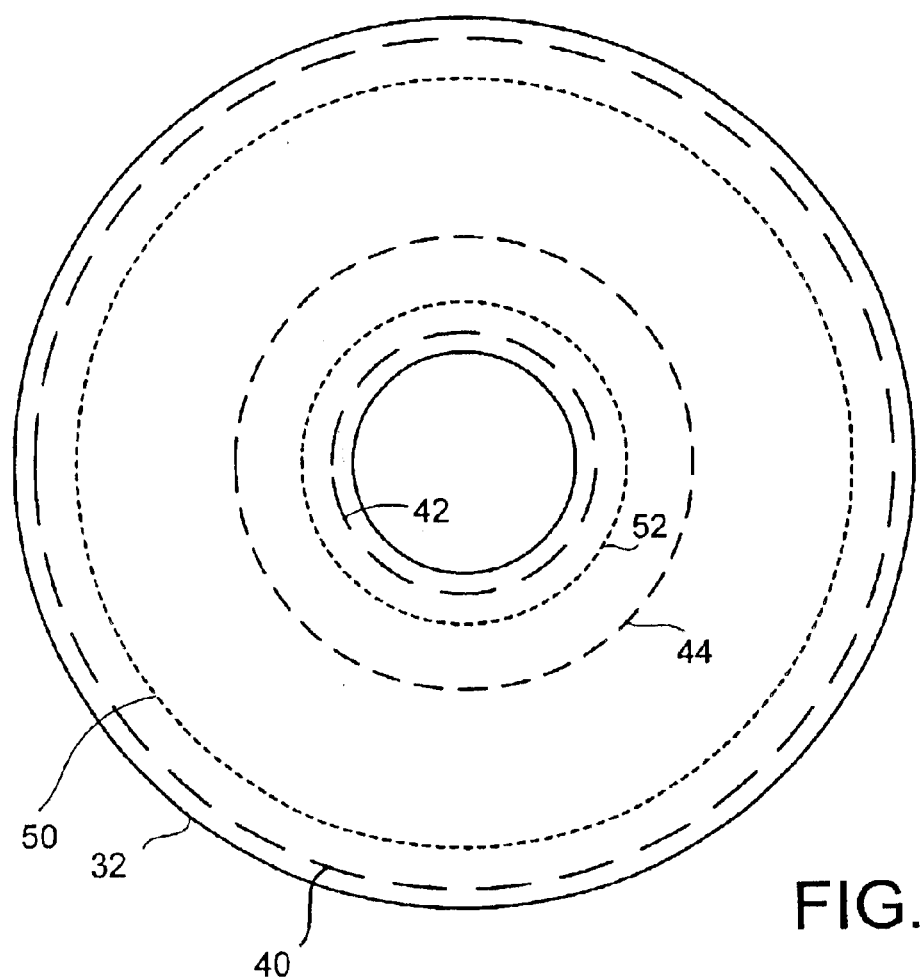
FIG. 3 is a schematic diagram of a disk surface of the disk drive showing allocation of data storage tracks based on track defect density, according to the present invention.
Figure 4:
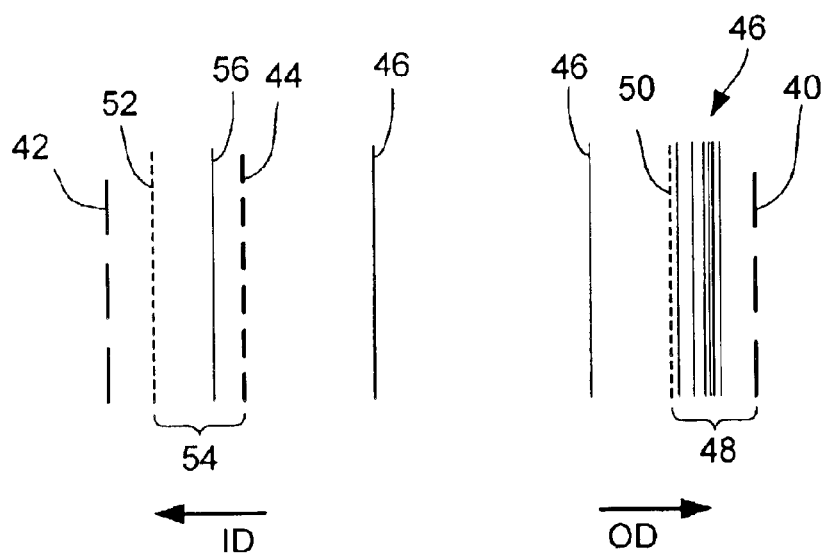
FIG. 4 is a more detailed schematic diagram of the data storage tracks of FIG. 3 showing track defect density.

With reference to FIGS. 1 to 4, the present invention may be embodied in a method 10 (FIG. 1) for improving the seek performance of a disk drive 30 (FIG. 2). The disk drive has a disk 32 formatted with a plurality of concentric data storage tracks 34, and has an actuator 36 for positioning a head 38 over the data storage tracks between an outer diameter (OD) limit 40 and an inner diameter (ID) limit 42 (FIGS. 3 and 4) for reading and writing data. The disk drive is configured to meet a targeted data storage capacity by allocating data storage tracks between the OD and ID limits. In the method, the data storage tracks between an initial OD limit 40 and an initial ID limit 44 are scanned to flag data storage tracks 46 which are not suitable for storing data (step 12). A band 48 of data storage tracks nearest to and including the initial OD limit are analyzed to determine a track defect density based on flagged data storage tracks 46 within the band of data storage tracks (step 14). If the track defect density of the band of data storage tracks exceeds a predetermined threshold (step 16), then the disk drive 30 is reconfigured by adjusting the initial OD and ID limits (to, for example, adjusted OD and ID limits, 50 and 52, respectfully) to exclude the analyzed band of data storage tracks and to maintain the targeted data storage capacity (step 18). Adjusting the initial OD and ID limits improves the seek performance which would otherwise be disproportionately impacted by the track defect density in the analyzed band of data storage tracks.

For reasons of data transfer performance, the data storage tracks 34 toward the OD limit 40 of a high-performance magnetic disk drive 30 are preferred over the data storage tracks toward the ID limit 42. For example, the recordable disk surface of a disk drive may support a data storage capacity of 40 gigabytes (GB), but the disk drive may be configured with a usable data storage capacity of 30 GB by not using data storage tracks adjacent to the ID of the recordable disk surface, to provide enhanced data transfer performance. However, the band 48 of data storage tracks between the disk's recordable OD limit 40 and adjusted OD limit 50 may have a relatively high density of flagged data storage tracks 46. These flagged data storage tracks 46 are not used for storing user data and must be skipped during a seek operation covering that region of the disk 32. A controlled rotation rate for the actuator 36 necessarily results in an increased the transit time as the head skips over the unused tracks, which transmit time may adversely impact the disk drive's seek performance. By retiring all of the data storage tracks in the band 48 affected with a relatively high defect density, and replacing that band with a relatively low defect band 54 of data storage tracks, between the initial ID limit 44 and the adjusted ID limit 52, while maintaining the disk drive's targeted data storage capacity, the invention improves the seek performance of the disk drive. Although the replacement band 54 may have defective data storage tracks 56, if the defect density of the replacement band is substantially lower than that of the OD band 48, the seek performance is improved. Thus, disk drives having a relatively high data storage track density near the disk's OD may provide high seek performance by adaptively allocating the data storage tracks if relatively low defect density data storage tracks toward the ID limit are available to replace the high defect density data storage tracks adjacent to the disk's OD limit.

Advantageously, the data storage capacity of the excluded band 48 may be about three percent (3%) of the targeted data storage capacity. However, the band may reach twenty percent (20%) of the targeted data storage capacity. Also, the predetermined threshold for the track defect density may be a ratio of about one flagged data storage track 46 per every one-hundred data storage tracks 34 (1:100). Thus, the flagged data storage tracks within the excluded band may comprise a minority of the data storage tracks within the excluded band so that most of the data storage tracks in the excluded band are good data storage tracks suitable for storing user data. With a severe media defect in the excluded band, the flagged data storage tracks may comprise a majority of the data storage tracks in the excluded band.

With reference again to FIG. 2, the disk drive 30 has a head disk assembly (HDA) 62 and a control system 64. The HDA includes the rotating magnetic disk 32 which has distributed position information in a plurality of uniformly spaced-apart servo wedges 66 and includes the rotary actuator 36 that pivots relative to a base and that carries the transduce head 38. The head periodically reads the position information from the servo wedges during a track following operation. The HDA 62 further includes a spindle motor 72, a preamplifier 74, and a voice coil motor (VCM) circuit 76 with a voice coil motor that is coupled to the rotary actuator and that responds to a control effort signal 78. The control system periodically adjusts the control effort signal during a track-followed operation based on the position information. The control system also includes circuitry and processors that control the HDA and that provides an intelligent interface between a host 82 and the HDA for execution of read and write commands. The control system may have, for example, an internal microprocessor and nonvolatile memory. Program code for implementing the techniques of the invention may be stored in the nonvolatile memory and transferred to volatile random access memory (RAM) for execution by the microprocessor.

What is claimed is:

1. In a disk drive having a disk formatted with a plurality of concentric data storage tracks and having an actuator for positioning a head over the data storage tracks between an outer diameter (OD) limit and an inner diameter (ID) limit for reading and writing data, the disk drive being configured to meet a targeted data storage capacity by allocating data storage tracks between the OD and ID limits, a method for improving seek performance of the disk drive comprising the steps of:

scanning the data storage tracks between an initial OD limit and an initial ID limit to flag data storage tracks which are not suitable for storing data;

analyzing a band of data storage tracks nearest to and including the initial OD limit to determine a track defect density based on flagged data storage tracks within the band of data storage tracks;

if the track defect density of the band of data storage tracks exceeds a predetermined threshold, then reconfiguring the disk drive by adjusting the initial OD and ID limits to exclude the analyzed band of data storage tracks and to maintain the targeted data storage capacity;

wherein adjusting the initial OD and ID limits improves the seek performance which would otherwise be disproportionately impacted by the track defect density in the analyzed band of data storage tracks.

2. A method for improving seek performance as defined in claim 1, wherein adjusting the initial OD and ID limits to exclude the analyzed band of data storage tracks and to maintain the targeted data storage capacity comprises replacing the excluded analyzed band of data storage tracks with a replacement band of data storage tracks that extends from the initial ID limit toward an ID of the disk.

3. A method for improving seek performance as defined in claim 1, wherein adjusting the initial OD and ID limits to exclude the analyzed band of data storage tracks and to maintain the targeted data storage capacity comprises setting adjusted OD and ID limits.

4. A method for improving seek performance as defined in claim 1, wherein the predetermined threshold for the track defect density is a ratio of about one flagged data storage track per every one hundred data storage tracks.

5. A method for improving seek performance as defined in claim 1, wherein a data storage capacity of the excluded band of data storage tracks is about three percent of the targeted data storage capacity.

6. A method for improving seek performance as defined in claim 1, wherein the flagged data storage tracks within the excluded band of data storage tracks comprise a minority of the data storage tracks within the excluded band.

7. A method for improving seek performance as defined in claim 1, wherein the flagged data storage tracks within the excluded band of data storage tracks comprise a majority of the data storage tracks within the excluded band.

* * * * *